United States Patent
Yamashita et al.

(10) Patent No.: US 12,486,891 B2
(45) Date of Patent: Dec. 2, 2025

(54) POWER TRANSMISSION DEVICE

(71) Applicants: JATCO LTD, Fuij (JP); Nissan Motor Co., Ltd., Yokohama (JP)

(72) Inventors: Katsunori Yamashita, Kanagawa (JP); Masayasu Kinoshita, Kanagawa (JP); Yasuaki Yumoto, Tokyo (JP); Tsutomu Itou, Shizuoka (JP); Satoshi Wakatsuki, Novi, MI (US); Kazuya Numata, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/847,007

(22) PCT Filed: Mar. 23, 2023

(86) PCT No.: PCT/JP2023/011619
§ 371 (c)(1),
(2) Date: Sep. 13, 2024

(87) PCT Pub. No.: WO2023/182456
PCT Pub. Date: Sep. 28, 2023

(65) Prior Publication Data
US 2025/0207660 A1  Jun. 26, 2025

(30) Foreign Application Priority Data

Mar. 23, 2022 (JP) .................................. 2022-047616

(51) Int. Cl.
*F16H 57/031* (2012.01)
*F16H 37/02* (2006.01)
(Continued)

(52) U.S. Cl.
CPC ....... *F16H 57/031* (2013.01); *F16H 57/0408* (2013.01); *F16H 37/021* (2013.01);
(Continued)

(58) Field of Classification Search
CPC ......... F16H 57/02–037; F16H 57/0408; F16H 57/045–0453; F16H 2057/02043–0206;
(Continued)

(56) References Cited

U.S. PATENT DOCUMENTS 5,440,951 A * 8/1995 Okada .................. B60K 17/105
475/159
7,699,738 B2 * 4/2010 Oomura .................. F04C 2/086
184/29
(Continued)

FOREIGN PATENT DOCUMENTS

CN 214775204 U * 11/2021
DE 102019218976 B4 * 10/2023 ............. B60K 17/06
(Continued)

*Primary Examiner* — James J Taylor, II
(74) *Attorney, Agent, or Firm* — Global IP Counselors, LLP (57) ABSTRACT

A power transmission device for a vehicle includes a housing that accommodates a power transmission mechanism, and a control valve configured to control a pressure of oil supplied to the power transmission mechanism. The power transmission mechanism includes an input shaft, an intermediate shaft, and an output shaft. The housing defines an insertion hole for a charging pipe. The output shaft is located farther toward a rear of a vehicle than the input shaft. The intermediate shaft is located above the output shaft. The control valve is arranged upright on a vehicle front side of the input shaft. The housing is provided with a recessed portion that is recessed inwardly in a region of the housing below the intermediate shaft and further toward the rear of the vehicle than the output shaft. The insertion hole is provided in a bottom section of the recessed portion when viewed from above.

9 Claims, 8 Drawing Sheets

(51) Int. Cl.
  *F16H 57/035* (2012.01)
  *F16H 57/037* (2012.01)
  *F16H 57/04* (2010.01)
  *F16H 61/00* (2006.01)

(52) U.S. Cl.
  CPC .......... *F16H 57/035* (2013.01); *F16H 57/037* (2013.01); *F16H 57/0435* (2013.01); *F16H 61/0009* (2013.01)

(58) Field of Classification Search
  CPC ...................... F16H 37/021–2037/0893; F16H 2037/101–104; F16H 61/0003–0009
  See application file for complete search history.

(56) References Cited

U.S. PATENT DOCUMENTS

| | | | |
|---|---|---|---|
| 9,644,722 B2 * | 5/2017 | Garcia | F16H 47/065 |
| 11,859,714 B2 * | 1/2024 | Yukawa | F16H 61/0006 |
| 12,049,950 B2 * | 7/2024 | Hidaka | F16H 61/0006 |
| 2007/0117665 A1 * | 5/2007 | Yamazaki | F16H 57/0489 474/28 |

FOREIGN PATENT DOCUMENTS

| | | |
|---|---|---|
| JP | 2001-296169 A | 10/2001 |
| JP | 2012-057498 A | 3/2012 |
| JP | 2015-161224 A | 9/2015 |

* cited by examiner

POWER TRANSMISSION DEVICE

CROSS-REFERENCE TO RELATED APPLICATIONS

This application is a U.S. national stage application of International Application No. PCT/JP2023/011619, filed on Mar. 23, 2023. This application also claims priority to Japanese Patent Application No 2022-047616, filed on Mar. 23, 2022.

BACKGROUND

Technical Field

The present invention relates to a power transmission device.

Background Information

Japanese Patent Laid-Open Publication No. 2015-161224 discloses an oil level gauge for measuring the amount of oil inside an engine or drive device.

In Japanese Patent Laid-Open Publication No. 2015-161224, a guide pipe is fixed to the side of the case of the drive device. The lower end of the guide pipe is fitted into a through-hole provided in the case. The upper end of the guide pipe is provided with an opening facing upward at the upper part of the case. The oil level gauge is inserted from the upper end of the guide pipe, with the gauge part at the tip positioned inside the case, while sealing the opening of the guide pipe.

Inside the case, the gauge part is positioned so that at least a part thereof is immersed in the oil collected in the case.

When in use, the oil level gauge is pulled out from the guide pipe. The height position of the oil filling the case is then determined from the position of the oil adhering to the gauge part.

SUMMARY

A charging pipe, which is a type of guide pipe, is used for measuring the height of oil filling the case and for filling the case with oil.

In a drive device, if a housing section for the control valve is to be provided on the vehicle front side of the case, it becomes impossible to install a charging pipe on both sides of the case in the direction of the axis of rotation and on the vehicle front side. In such a case, it may not be possible to ensure a place to install the charging pipe on other sides of the case due to the relationship with other component parts.

In this situation, it is conceivable to provide the charging pipe inside the case and make a communication port with the charging pipe open at the upper part of the case. However, since rotating elements, etc., are located inside the case, attempting to provide the charging pipe while avoiding interference with the rotating elements may cause the charging pipe to have a complex shape bent in multiple places.

As a result, when pulling the oil level gauge out of the charging pipe, the gauge part may interfere with the inner circumference of the charging pipe, potentially scraping off the adhered oil. In such cases, it becomes difficult to determine the oil level.

Therefore, there is a demand to enable appropriate determination of the oil level.

One aspect of the present disclosure is a power transmission device for a vehicle, comprising a housing that accommodates a power transmission mechanism, a control valve that controls the oil pressure supplied to the power transmission mechanism, an input shaft of the power transmission mechanism, an intermediate shaft of the power transmission mechanism, an output shaft of the power transmission mechanism, and an insertion port for a charging pipe, wherein the output shaft is positioned farther toward the rear of the vehicle than the input shaft, the intermediate shaft is positioned above the output shaft, the control valve is arranged upright on the vehicle front side of the input shaft, the housing is provided with a recessed portion that is recessed inwardly in a region farther toward the rear of the vehicle than the output shaft and below the intermediate shaft, and the insertion port is provided in the bottom part of the recess as seen from above.

According to one aspect of the present disclosure, the oil level can be appropriately determined.

BRIEF DESCRIPTION OF THE DRAWINGS

Referring now to the attached drawings which form a part of this original disclosure.

DETAILED DESCRIPTION

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine). Note that if the power transmission device is a device transmitting the output rotation of a motor, the term "control unit" in this specification means an inverter.

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping as viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap when viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle relative to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL.

In this case, the plurality of pressure regulating valves need not be strictly arranged in single file in the direction of the vertical line VL.

For example, if the plurality of valve bodies are stacked to form the control valve, the following is possible. Namely, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present invention is described below.

Figure 1:
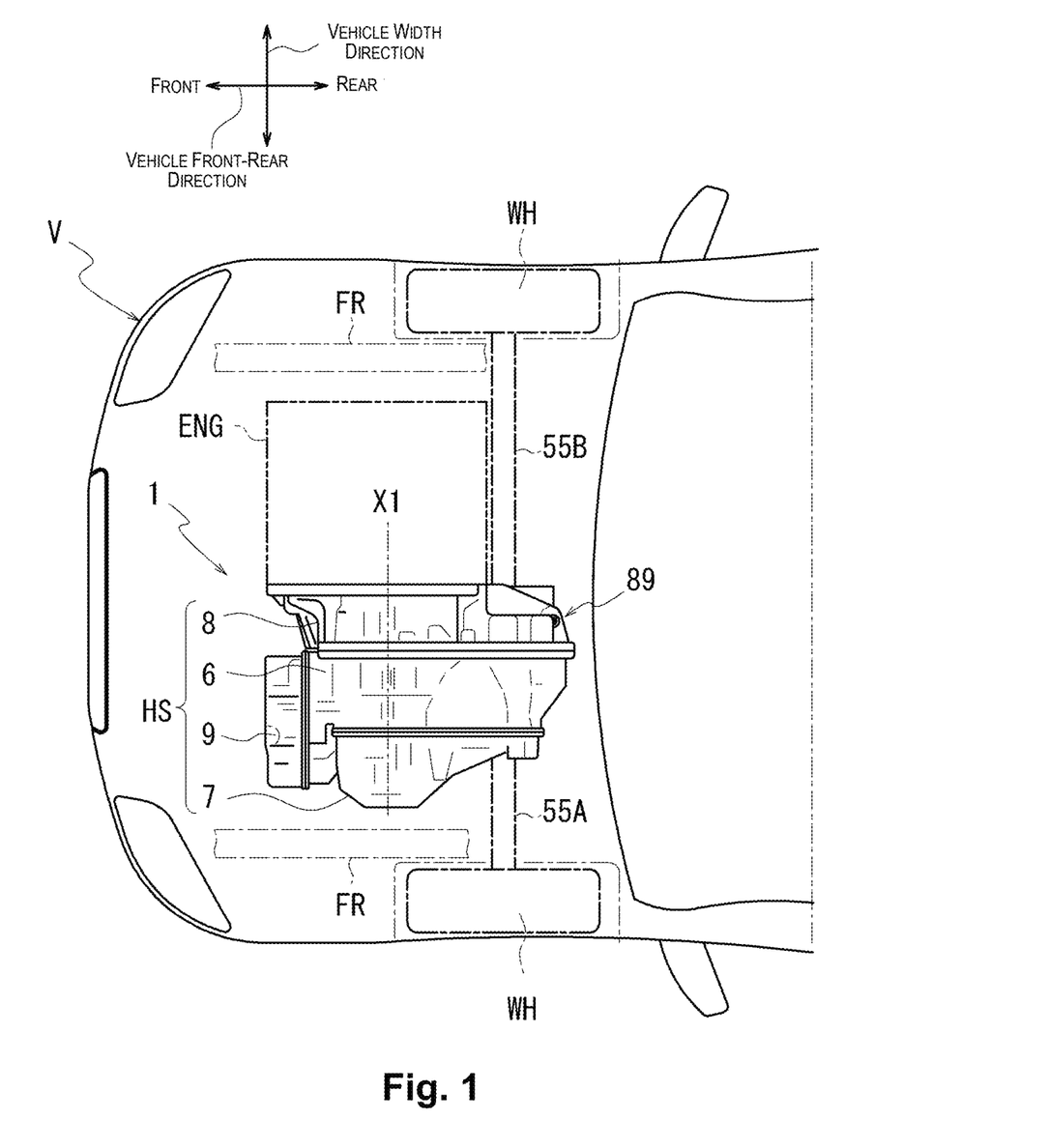
FIG. 1 is a schematic diagram illustrating the arrangement of a power transmission device in a vehicle.

FIG. 1 is a schematic diagram illustrating the arrangement of a power transmission device 1 in a vehicle V.

Figure 2:
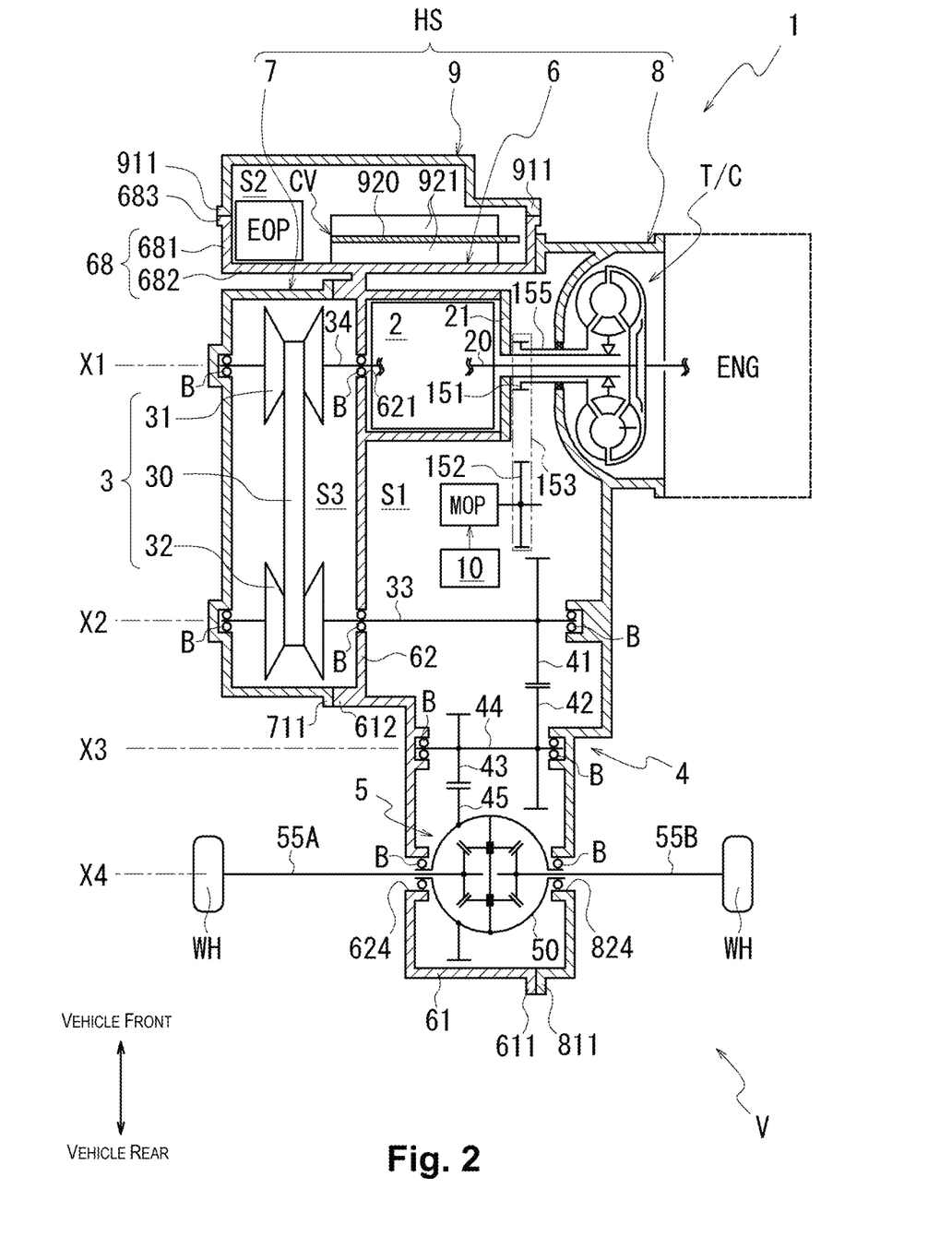
FIG. 2 is a schematic diagram showing a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

Here, the torque converter T/C, the forward-reverse switching mechanism 2, the variator 3, the reduction mechanism 4, and the differential device 5 are component elements of the power transmission mechanism in the invention.

As shown in FIG. 2, in the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential device 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates in together with the output shaft 33 of the secondary pulley 32.

The idler gear 42 meshes with the output gear 41 in a manner allowing transmission of rotation. The idler gear 42 is spline-fitted to an idler shaft 44. The idler gear 42 rotates in together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The input shaft 20 of the forward-reverse switching mechanism 2 and the input shaft 34 of the primary pulley 31 are arranged coaxially along the axis of rotation X1. The input shaft 20 of the forward-reverse switching mechanism 2 corresponds to the input shaft of the power transmission mechanism in the invention.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3 (third axis). The idler shaft 44 having the idler gear 42 and reduction gear 43 corresponds to the intermediate shaft of the power transmission mechanism in the invention.

The final gear 45 and the drive shafts 55A, 55B are arranged coaxially on a common axis of rotation X4 (fourth axis). The drive shafts 55A, 55B correspond to the output shaft of the power transmission mechanism in the invention.

In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
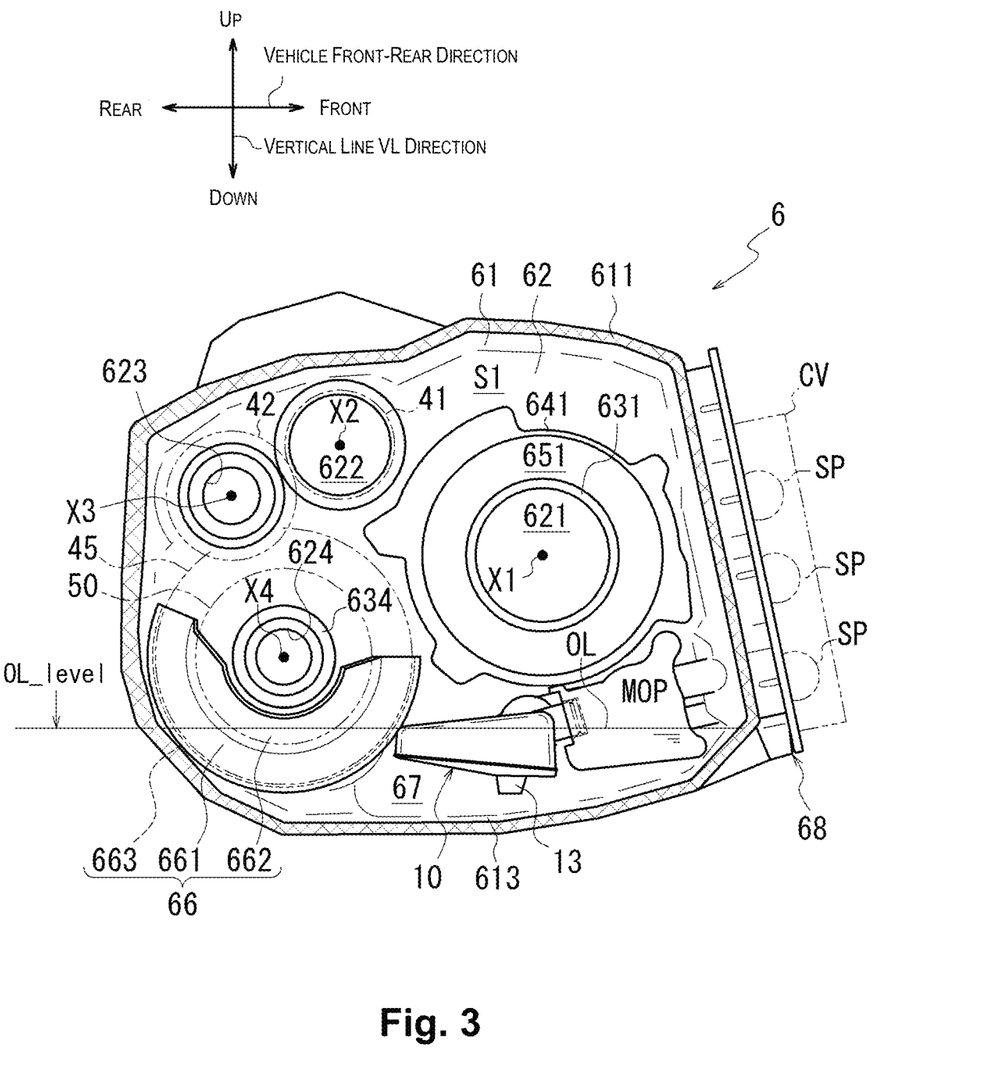
FIG. 3 is a diagram of a case as viewed from the second cover side.

FIG. 3 is a schematic diagram of the case 6 as seen from the second cover 8 side.

As shown in FIG. 3, the case 6 has a cylindrical circumferential wall section 61 and a partition section 62.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a third chamber S3.

In the case 6, an opening on the first chamber S1 side is sealed by the second cover 8 (torque converter cover). An opening on the third chamber S3 side is sealed by the first cover 7 (side cover).

The first chamber S1 accommodates the forward-reverse switching mechanism 2, the reduction mechanism 4, and the differential device 5. The third chamber S3 accommodates the variator 3.

In the case 6, a housing section 68 that forms a second chamber S2 is attached to the outer circumference of the circumferential wall section 61 on the vehicle front side. The housing section 68 is provided with an opening facing the vehicle front side. The opening of the housing section 68 is sealed by the third cover 9, forming the closed second chamber S2.

The second chamber S2 contains the control valve CV and the electric oil pump EOP.

As shown in FIG. 2, the control valve CV has a basic structure in which a separation plate 920 is sandwiched between valve bodies 921, 921. An oil pressure control circuit (not shown) is formed inside the control valve CV. The oil pressure control circuit is provided with a solenoid that is driven based on instructions from a control device (not shown) and pressure regulating valves SP (spool valves) that operate based on signal pressure produced by the solenoid.

Inside the second chamber S2, the control valve CV is upright, so that the direction of stacking of the valve bodies 921, 921 is aligned in the front-rear direction of the vehicle.

As shown in FIG. 3, in the second chamber S2 formed inside the housing section 68, the control valve CV is upright so as to satisfy the following conditions. (a) A plurality of pressure regulating valves SP (spool valves) inside the control valve CV are arranged in the direction of the vertical line VL (the vertical direction) based on the state of installation of the power transmission device 1 in the vehicle V, and (b) a direction of advancement and retraction of the pressure regulating valves SP (spool valves) is along the horizontal direction.

In this specification, the term "upright" means that the control valve CV is installed in an orientation where the spool valves inside the control valve are arranged with shifted positions in the direction of the vertical line VL. In this state, the control valve CV is oriented so that the stacking direction of the valve bodies 921, 921 is aligned with the horizontal line direction (vehicle front-rear direction).

Thus, the control valve CV is arranged upright in the second chamber S2 while ensuring that the advancement and retraction of the spool valves is not hindered. This prevents the second chamber S2 from becoming larger in the vehicle front-rear direction.

As shown in FIG. 3, the partition section 62 is located inside the joining section 611 in the case 6.

The partition section 62 of the case 6 is provided within a range cutting across the axes of rotation (axes of rotation X1 to X4) of the power transmission mechanism. The partition section 62 is provided in a direction essentially orthogonal to the axes of rotation (axes of rotation X1 to X4).

Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). toward The cylindrical support wall section 631 and the circumferential wall section 641 project toward the viewer in FIG. 2 (toward the second cover 8 in FIG. 1).

A region 651 between the support wall section 631 and the circumferential wall section 641 is a cylindrical space accommodating a piston (not shown) of the forward-reverse switching mechanism 2, friction plates (forward clutch, reverse brake), etc.

An input shaft 34 (see FIG. 2) of the primary pulley 31 is rotatably supported on the inner circumference of the support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle when viewed from the axis of rotation X1.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle when viewed from the axis of rotation X1, and diagonally below toward the rear of the vehicle when seen from the axis of rotation X2.

As shown in FIG. 3, the through-hole 624 is formed around the axis of rotation X4.

In the power transmission device 1 mounted in the vehicle V, the axis of rotation X4 is positioned diagonally below toward the rear of the vehicle when viewed from the axis of rotation X1, diagonally below toward the rear of the vehicle when viewed from the axis of rotation X2, and diagonally below toward the front of the vehicle when viewed from the axis of rotation X3.

A cylindrical support wall section 634 surrounding the through-hole 624 is provided on the surface of the partition section 62 facing the first chamber S1 (toward the viewer). The differential case 50 of the differential device 5 is rotatably supported on the inner circumference of the support wall section 634 via bearings B. The drive shaft 55A (see FIG. 2) extending from the differential case 50 passes through the through-hole 624.

As shown in FIG. 2, the final gear 45, which forms a ring shape when viewed from the direction of the axis of rotation X4, is fixed to the outer circumference of the differential case 50. The final gear 45 rotates around the axis of rotation X4 together with the differential case 50.

As shown in FIG. 3, a baffle plate 66 is attached below the through-hole 624 on the surface of the partition section 62 facing the first chamber S1 (toward the viewer). When viewed from the direction of the axis of rotation X4, the baffle plate 66 forms a semicircular shape with the curved surface facing downward. The baffle plate 66 has side plate sections 661, 661 (see FIG. 9) covering the side surface of the final gear 45 in the direction of the axis of rotation X4, an arc-shaped wall section 662 covering the side surface of the differential case 50 in the direction of the axis of rotation X4, and a circumferential wall section 663 covering the outer circumference of the final gear 45.

In the case 6, the region below the arc-shaped circumferential wall section 641 and farther toward the front of the vehicle than the arc-shaped wall section 662 of the baffle plate 66 serves as a housing section 67 for the strainer 10 and the mechanical oil pump MOP.

The housing section 67 is located at the bottom of the case 6 (housing HS).

Therefore, the oil OL used for driving and cooling the components of the power transmission mechanism is collected in the housing section 67.

The housing section 67 is a space which is closed at one end, and in the housing section 67, a partition section 62 that serves as the bottom wall is located on the side away from the viewer in FIG. 2.

In the housing section 67, the strainer 10 is provided with an oil OL intake port 13 facing the bottom wall section 613 of the case 6.

In the power transmission device 1, when the pumps (the mechanical oil pump MOP, the electric oil pump EOP) are driven, the oil OL collected in the bottom of the first chamber S1 (housing section 67) is suctioned through the strainer 10 and supplied to the pump side.

Figure 4:
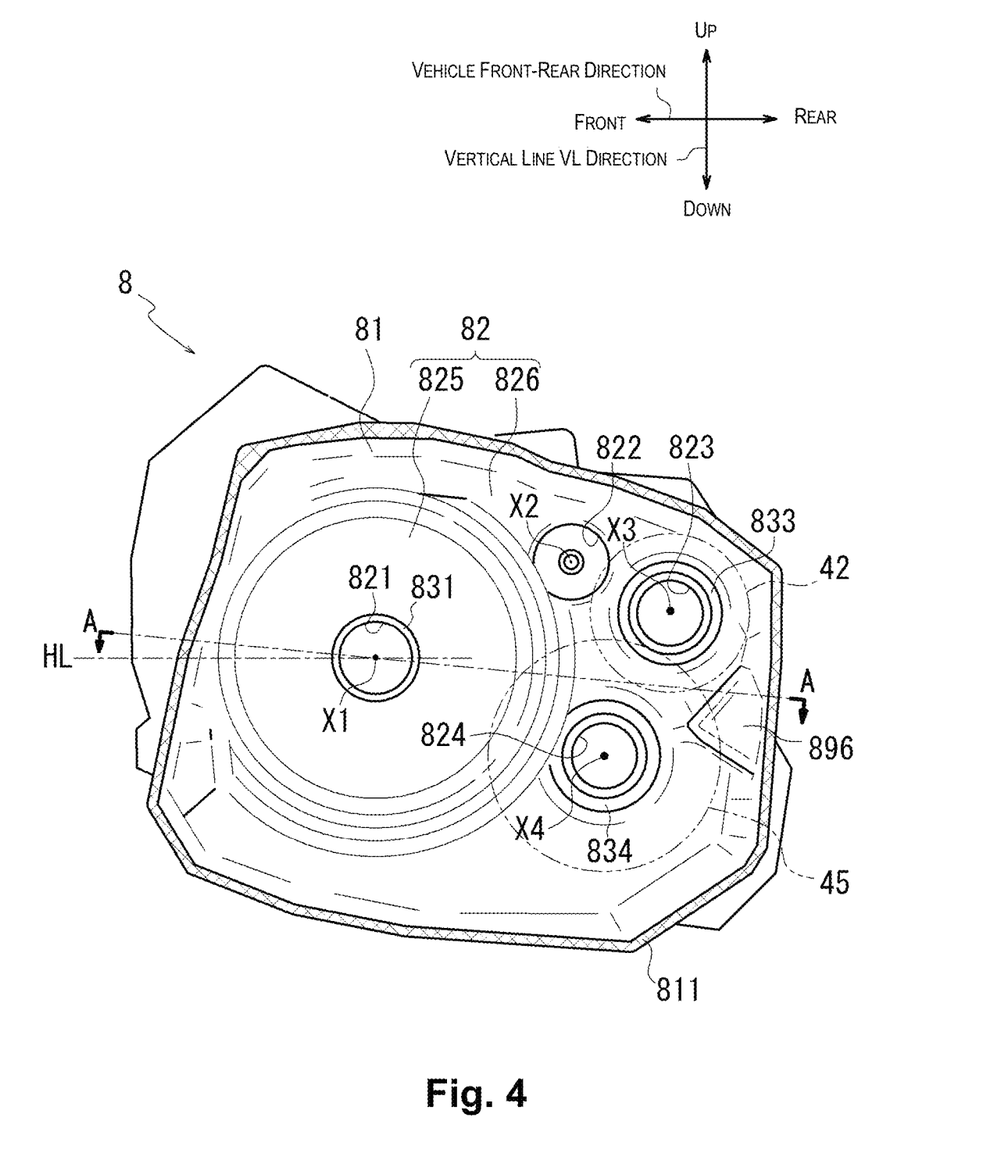
FIG. 4 is a diagram of the second cover as viewed from the case side.

FIG. 4 is a plan view of the second cover 8 as viewed from the case 6 side. In FIG. 4, crosshatching is applied to indicate the region intersecting the joining section 811.

Figure 5:
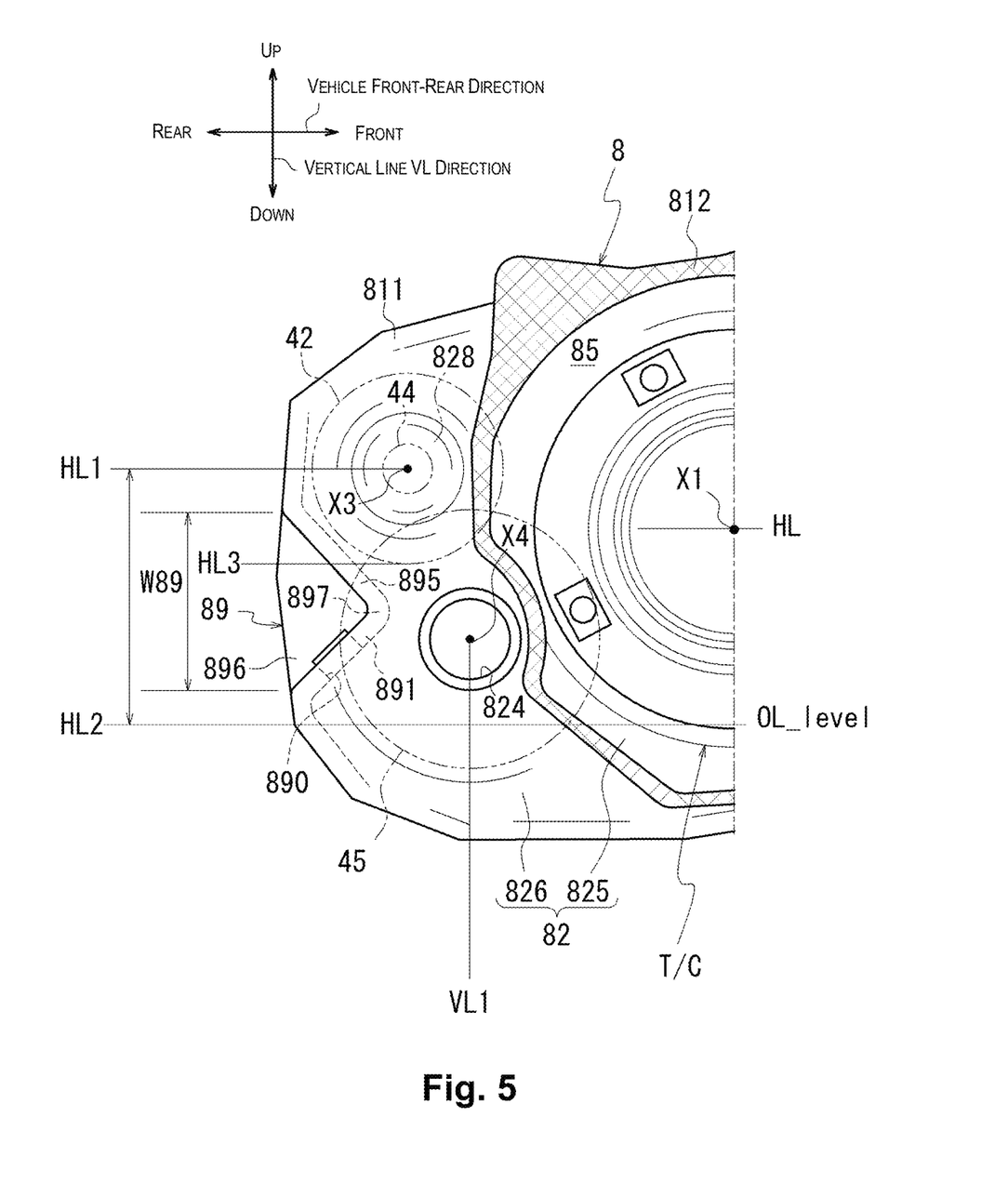
FIG. 5 is a diagram of the second cover as viewed from the engine side.

FIG. 5 is a plan view of the second region 826 side of the second cover 8 as viewed from the engine ENG side. In FIG. 5, crosshatching is applied to indicate the region where the joining section 812 intersects with the engine ENG side. Furthermore, the positions of the outer circumferences of the final gear 45 and the idler gear 42 located on the side away from the viewer of the partition section 82, and the positions of the bottom wall section 891 and the first wall section 895 constituting the recessed portion are shown with dashed lines.

Figure 6:
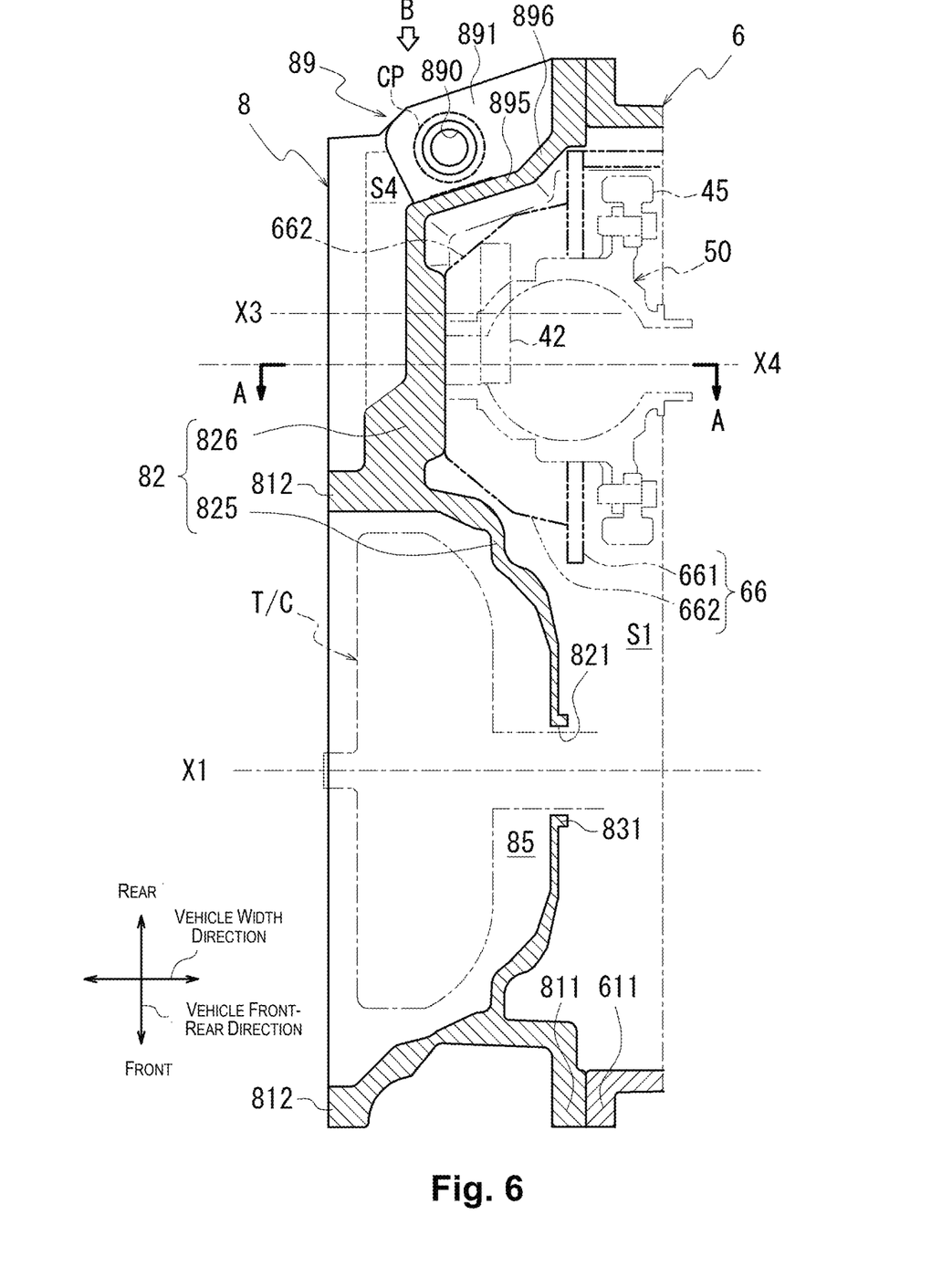
FIG. 6 is a cross-sectional view of the second cover.

FIG. 6 is a schematic diagram schematically showing a cross-section of the second cover 8 along line A-A in FIG. 4.

As shown in FIG. 4, the second cover 8 has a cylindrical circumferential wall section 81 and a partition section 82. The partition section 82 is provided across a range that crosses the axes of rotation (axis of rotation X1 to axis of rotation X4) of the power transmission mechanism.

The circumferential wall section 81 has an end surface on the case 6 side (toward the viewer) that serves as the joining section 811 with the case 6. Inside the joining section 811 of the second cover 8, the partition section 82 is located.

The partition section 82 is provided with through-holes 821, 824 and support holes 822, 823.

The partition section 82 has a first region 825 and a second region 826.

The first region 825 is an essentially circular region around the axis of rotation X1. The first region 825 bulges toward the viewer (the first chamber S1 side). On the opposite side of the first region 825 (the engine ENG side), the torque converter T/C is housed (see FIG. 6).

As shown in FIG. 4, the through-hole 821, located approximately at the center of the first region 825, is formed around the axis of rotation X1. A cylindrical support wall section 831 surrounding the through-hole 821 is provided on the surface of the partition section 82 facing the first chamber S1 (toward the viewer).

The second region 826 is the region in the partition section 82 excluding the first region 825. The second region 826 is located toward the rear of the vehicle when viewed from the axis of rotation X1.

The second region 826 is provided with support holes 822, 823, and a through-hole 824.

The support hole 822 is a closed-bottom hole formed around the axis of rotation X2. The output shaft 33 (see FIG. 2) of the secondary pulley 32 is rotatably supported on the inner circumference of the support hole 822 via bearings B.

The support hole 823 is a closed-bottom hole formed around the axis of rotation X3. In the second region 826, a cylindrical support wall section 833 surrounding the support hole 823 is provided. In FIG. 4, the support wall section 833 protrudes toward the viewer.

The idler shaft 44 (see FIG. 2) of the reducer mechanism 4 is rotatably supported on the inner circumference of the support wall section 833 via bearings B.

The through-hole 824 is formed around the axis of rotation X4. In the second region 826, a cylindrical support wall section 834 surrounding the through-hole 824 is provided. In FIG. 4, the support wall section 834 protrudes toward the viewer.

The differential case 50 (see FIG. 2) of the differential device 5 is rotatably supported on the inner circumference of the support wall section 834 via the bearings B.

In the second region 826, a second wall section 896 constituting the recessed portion 89 discussed below is located in a region farther toward the rear of the vehicle than the axis of rotation X4 and below the axis of rotation X3. The second wall section 896 is positioned toward the front (toward the case 6 side) relative to the second region 826. The region of the second wall section 896 is formed by recessing a part of the second region 826 of the second cover 8 toward the viewer (the case 6 side) when viewed from the direction of the axis of rotation X4.

As shown in FIG. 5, on the engine ENG side of the second cover 8, an engine ENG joining section 812 is provided along the outer circumference of the torque converter T/C. The inside of the joining section 812 serves as the housing section 85 for the torque converter T/C (see FIGS. 5 and 6).

As shown in FIG. 5, the second region 826 is located toward the rear of the vehicle when viewed from the housing section 85. The through-hole 824 opens into the second region 826, below the horizontal line HL passing through the axis of rotation X1. This through-hole 824 is penetrated by the drive shaft 55B extending from the differential case 50 (see FIG. 2).

The support section 828 for the idler shaft 44 is located diagonally above toward the rear of the vehicle, as seen from the through-hole 824. The support section 828 is positioned behind the support hole 823 described above (see FIG. 4). The support section 828 is centered on the axis of rotation X3. The support section 828 bulges toward the viewer.

A recessed portion 89 is provided toward the rear of the vehicle, as viewed from the through-hole 824. The recessed portion 89 is formed by recessing a part of the region on the vehicle rear side of the second region 826 away from the viewer (the case 6 side) and to the right in the diagram (toward the front of the vehicle).

Viewed from the direction of the axis of rotation X4, the recessed portion 89 is formed in a tapering shape in which a width W89 in the vertical line VL direction narrows toward the front of the vehicle.

The recessed portion 89 is a space enclosed by three wall sections (the bottom wall section 891, the first wall section 895, the second wall section 896). The recessed portion 89 is provided with openings facing the engine ENG side (toward the viewer) and toward the rear of the vehicle.

As shown in FIG. 6, the recessed portion 89 is located outside the partition section 82 (second region 826).

Viewed from above in the vertical line VL direction, in the vehicle front-rear direction, the first wall section 895 is positioned on the side of the recessed portion 89 facing the baffle plate 66 (arcuate wall section 662).

Viewed from above in the vertical line VL direction, in the vehicle width direction, the second wall section 896 is positioned on the side of the recessed portion 89 facing the baffle plate 66 (side plate section 661) and the final gear 45.

As shown in FIG. 5, when viewed from the direction of the axis of rotation X4, the connection section 897 between the bottom wall section 891 and the first wall section 895 is positioned overlapping with the final gear 45.

Furthermore, when viewed from the direction of the axis of rotation X4, the first wall section 895 extends diagonally below and toward the rear of the vehicle from the idler gear 42. Viewed from the direction of the axis of rotation X4, the first wall section 895 inclines toward the rear of the vehicle as it moves upwards away from the bottom wall section 891. Viewed from the direction of the axis of rotation X4, the first wall section 895 is in a positional relationship not overlapping with the idler gear 42.

As shown in FIG. 6, viewed from above the vehicle, in the recessed portion 89, the bottom wall section 891 is positioned spanning across the first wall section 895 and the second wall section 896 and outside the first wall section 895 and the second wall section 896. The bottom wall section 891 is provided with an insertion port 890 for a charging pipe CP.

Figure 7:
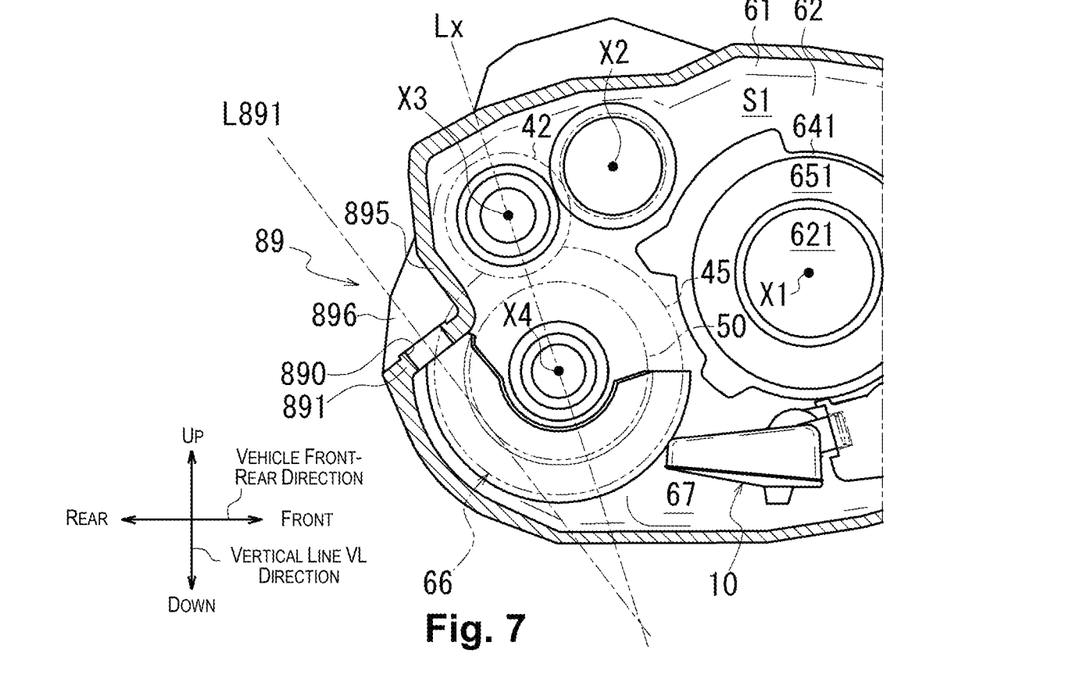
FIG. 7 is a cross-sectional view illustrating the arrangement of the insertion port of the charging pipe.

As shown in FIG. 7, the insertion port 890 penetrates through the thickness of the bottom wall section 891.

In this embodiment, the insertion port 890 is provided so as to satisfy the following conditions. (a) A straight line L891 along the opening direction of the insertion port 890 intersects a line Lx connecting the axis of rotation X3 and the axis of rotation X4 below the axis of rotation X4 (see FIG. 7). (b) Viewed from the radial direction of the axis of rotation X4 (the side indicated by arrow B in FIG. 6), the insertion port 890 is in a positional relationship overlapping with the baffle plate 66 (arcuate wall section 662) (see FIG. 6).

Figure 9:
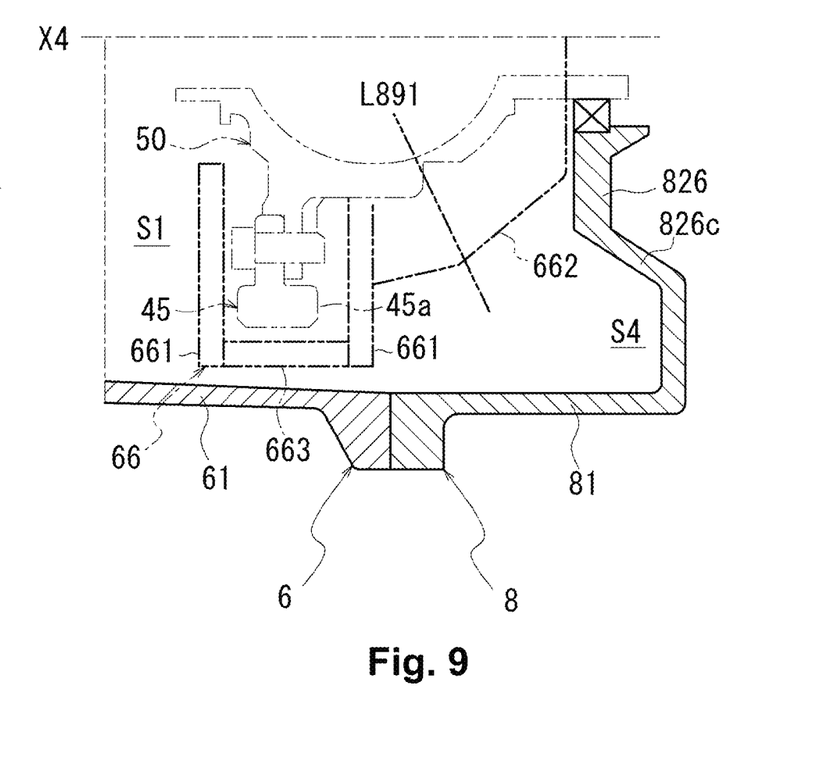
FIG. 9 is a cross-sectional view of the lower region of the second cover.

FIG. 9 is a schematic diagram showing a cross-section of the second cover 8 along line A-A in FIG. 6. In FIG. 9, the positions of the differential case 50 and the baffle plate 66, which are located toward the viewer from the cross-section in the lower part of the first chamber S1, are indicated with dashed lines.

As shown in FIG. 9, at the bottom of the second cover 8, a gap is provided between a lower edge 826c of the second region 826 and the circumferential wall section 81 in the radial direction of the axis of rotation X4. At the bottom of the second cover 8, an oil capture section S4 is formed in the lower region where the differential case 50 is located.

As shown in FIG. 6, the oil capture section S4 extends in the vehicle front-rear direction. The oil capture section S4 is a space open toward the case 6 side (right side in the diagram). Thus, the oil capture section S4 communicates with the first chamber S1, and forms part of the first chamber S1.

As shown in FIG. 9, the oil capture section S4 is located on the extension of the straight line L891, which aligns with the opening direction of the insertion port 890. Therefore, when the charging pipe CP is inserted from the insertion port 890 as shown in FIG. 8, the tip of the charging pipe CP faces the oil capture section S4.

Figure 8:
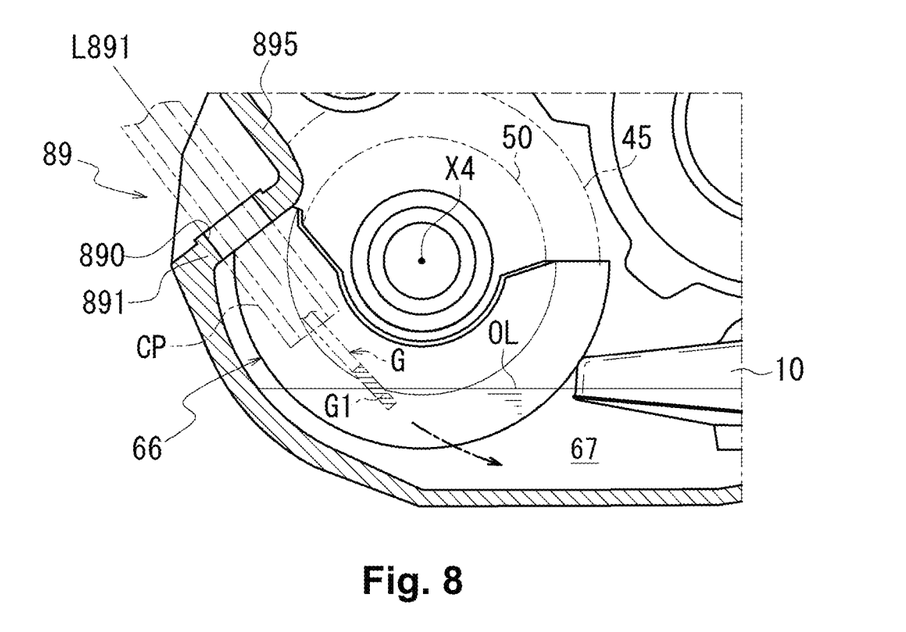
FIG. 8 is a cross-sectional view illustrating the arrangement of the charging pipe after insertion into the insertion port.

Consequently, when the oil level gauge G is inserted through the inside of the charging pipe CP, a gauge part G1 of the oil level gauge G is inserted straight toward the oil capture section S4 (see FIGS. 8 and 9).

As shown in FIG. 9, since the baffle plate 66 is located on the case 6 side (left side in the figure) of the oil capture section S4, the inserted oil level gauge G does not interfere with rotating bodies such as the differential case 50 and the final gear 45.

Thus, the insertion port 890 of the charging pipe CP opens more toward the engine ENG side than the baffle plate 66 (see FIG. 6). Therefore, when the oil level gauge G is inserted through the inside of the charging pipe CP, since the sides of the differential case 50 and the final gear 45 are covered by the baffle plate 66, the oil level gauge G does not interfere with the differential case 50 or the final gear 45 (see FIG. 8).

Furthermore, the idler gear 42 is located on the vehicle front side of the insertion port 890 (see FIG. 6). Since the insertion port 890 opens below the lower edge of the idler gear 42, even if the oil level gauge G is inserted through the inside of the charging pipe CP, the oil level gauge G does not interfere with the idler gear 42.

Thus, as there is extra space in the lower part of the vehicle rear side of the second cover 8, the recessed portion 89 is provided so as to utilize this space, and the insertion port 890 for the charging pipe CP is provided in the bottom wall section 891 of the recessed portion 89. Since the insertion port 890 allows the shortest distance access to the housing section 67, which is the collection space for the oil OL, it is possible for the charging pipe CP, which is inserted from the insertion port 890, to be made in a simple shape with minimal curvatures. This suitably prevents a situation in which the gauge part G1 interferes with the inner circumference of the charging pipe CP when the oil level gauge G is pulled out of the charging pipe CP, causing the oil adhered thereto to be scraped off. Thus, it is possible to appropriately determine the oil level.

As described above, the power transmission device 1 in this embodiment has the following configuration.

(1) The power transmission device 1 for a vehicle V has the power transmission mechanism (the torque converter T/C, the forward and reverse switching mechanism 2, the variator 3, the reduction mechanism 4, the differential device 5) that transmits driving force from the engine ENG (drive source) to the drive wheels WH, WH, the housing HS that accommodates the power transmission mechanism, the control valve CV that controls the oil supplied to the power transmission mechanism, then input shaft 20 (input shaft) of the power transmission mechanism, then idler shaft 44 (intermediate shaft) of the power transmission mechanism, the drive shafts 55A, 55B (output shafts) of the power transmission mechanism, and the insertion port 890 for the charging pipe CP.

The drive shafts 55A, 55B are located farther toward the rear of the vehicle V than the input shaft 20.

The idler shaft 44 (third shaft) is positioned above the drive shafts 55A, 55B.

The control valve CV is upright on the vehicle front side of the input shaft 20.

The housing HS is provided with a recessed portion 89 that is recessed inwardly in an region of the housing HS that is farther toward the rear of the vehicle than the drive shafts 55A, 55B and below the idler shaft 44.

The bottom wall part 891 (bottom part) of the recessed portion 89, as viewed from the vertical line direction VL, is provided with an insertion port 890.

Within the housing HS, there is extra space allowing insertion of the charging pipe CP below the idler shaft 44 (intermediate shaft) on the vehicle rear side of the drive shafts 55A, 55B, which are the output shafts. The region below the drive shafts 55A, 55B is the oil OL collection space (housing section 67) used for lubricating and driving the power transmission mechanism.

Providing the insertion port 890 as described above allows the shortest distance access to the housing section 67, which is the collection space for the oil OL, and therefore the charging pipe CP inserted from the insertion port 890 can be made in a simple shaped with minimal curvatures. For instance, if a charging pipe has a complex shape, bent in multiple locations, when the oil level gauge G is pulled out of the charging pipe CP, there is a risk that the gauge part G1 may interfere with the inner circumference of the charging pipe CP, thereby causing the oil adhered thereto to be scraped off. With the foregoing configuration, the likelihood of such situations occurring can be reduced. This allows for appropriate determination of the oil level.

(2) rotating bodies (the differential case 50, the final gear 45) provided coaxially with the drive shafts 55A, 55B, and involved in transmission of rotation between the drive shafts 55A, 55B and the idler shaft 44, and a baffle plate 66 (cover) that covers one side of the rotating bodies in the axial direction of drive shafts 55A, 55B.

From the radial direction of the drive shafts 55A, 55B (fourth axis), the insertion port 890 is provided in a positional relationship overlapping with the baffle plate 66.

With this configuration, as shown in FIG. 6, when viewed from the horizontal line direction along the vehicle front-rear direction (arrow B direction), the insertion port 890 and the baffle plate 66 are arranged in an overlapping positional relationship.

This allows the baffle plate 66 (the cover) to prevent interference between the charging pipe CP inserted through the insertion port 890 and the rotating bodies (differential case 50, final gear 45). This also makes it possible to use the baffle plate 66 to prevent the oil OL stirred by rotation of the rotating bodies from moving into the housing section 67 where the charging pipe CP is inserted.

The oil OL stirred by rotation of the rotating bodies contains many air bubbles. Therefore, if the oil OL stirred by rotation of the rotating bodies moves to where the charging pipe CP is inserted, the air bubbles contained in the oil OL may affect the position of the oil adhering to the gauge part G1 of the oil level gauge G. This could lead to uncertainty in detecting the position of the oil OL within the housing HS.

With the foregoing configuration, the oil OL containing air bubbles can be prevented from reaching the gauge part G1, thus enabling more accurate detection of the position of the oil OL.

(3) The idler shaft 44 (intermediate shaft) is positioned on the vehicle rear side relative to the drive shafts 55A, 55B (output shafts).

The insertion port 890 is provided at a position where the straight line L891, which aligns with the opening direction of the insertion port 890, intersects with the line Lx connecting the idler shaft 44 (intermediate shaft) and the drive shafts 55A, 55B (output shafts), below the drive shafts 55A, 55B.

The insertion port 890 is positioned such that the straight line L891 which follows the opening direction of the insertion port 890, intersects with the straight line Lx connecting the idler shaft 44 (intermediate shaft) and the drive shafts 55A, 55B (output shafts), below the drive shafts 55A, 55B.

With this configuration, the charging pipe CP inserted through the insertion port 890 can reach the housing section 67, which is the collection part for the oil OL, without interfering with any rotating bodies. In particular interference with the idler gear 42 provided to the idler shaft 44 (intermediate shaft) can be prevented.

(4) The rotating bodies are the differential case 50 and the final gear 45, which is fixed around the outer circumference of the differential case 50.

The idler shaft 44 includes the idler gear 42, which is involved in transmitting rotation between the reduction gear 43 (transmission gear) meshed with the final gear 45, and the output shaft 33 of the secondary pulley 32 (another intermediate shaft), and along the axial direction of the idler shaft 44, the idler gear 42 is positioned to one side, as viewed from the reduction gear 43, of where the baffle plate 66 is located.

From the vehicle rear side, the insertion port 890 (recessed portion 89) is in a positional relationship overlapping the idler gear 42.

As seen from the reduction gear 43, the baffle plate 66 is located to one side (the engine side) of where the idler gear 42 is positioned. The baffle plate 66 is located below the idler gear 42 in the vertical line VL direction (see FIG. 7).

Consequently, when viewed from the vehicle rear side, the insertion port 890 is provided in a positional relationship that overlaps with both the idler gear 42 and the baffle plate 66, allowing the charging pipe CP, which is inserted through the insertion hole 890, to be provided in a manner avoiding interference with the differential case 50 and the idler gear 42.

(5) Viewed from the axial direction of the drive shafts 55A, 55B, the recessed portion 89 includes a first wall section 895 on the idler gear 42 side (see FIG. 6).

The lower edge (the connection part 897) of the first wall section 895 is positioned below the horizontal line HL3, which passes under the idler gear 42 (see FIG. 5).

With this configuration, the charging pipe CP inserted through the insertion port 890 is restricted from moving in a direction that would interfere with the idler gear 42 (downward in FIG. 6) by the first wall section 895.

Thus, the charging pipe CP, inserted from the insertion port 890, is suitably prevented from interfering with the idler gear 42.

(6) Viewed from the rear side of the vehicle, the recessed portion 89 is provided with a second wall section 896 on the final gear 45 side.

As shown in FIG. 6, the movement of the charging pipe CP inserted through the insertion port 890 toward the final gear 45, which would cause interference (direction to the right in FIG. 6), is restricted by the second wall section 896.

Therefore, interference between the charging pipe CP inserted through the insertion port 890 and the final gear 45 can be suitably prevented.

(7) Viewed from the rear side of the vehicle, the baffle plate 66 (cover) has a side plate section 661 (first cover section) that covers a side face 45a of the final gear 45 facing the differential case 50, and an arc-shaped wall section 662 (second cover section) that covers the lower outer circumference of the differential case 50.

As shown in FIG. 9, since the baffle plate 66 comprises the side plate section 661 covering the side face of the final gear 45 and the arc-shaped wall section 662 covering the lower outer circumference of the differential case 50, the final gear 45 and the differential case 50 can be protected from any interference by the charging pipe CP inserted through the insertion port 890.

(8) The housing HS has the case 6, which accommodates the power transmission mechanism, and the second cover 8 (torque converter cover), which covers the opening on the torque converter T/C side of the case 6.

The recessed portion 89 is provided in the second cover 8.

There is extra space within the second cover 8 (torque converter cover) toward the vehicle rear side. Therefore, when providing the recessed portion 89, the insertion port 890 can be provided at a position that avoids interference with the rotating elements inside case 6.

(9) Viewed from the axial direction of the drive shafts 55A, 55B (output shafts), the recessed portion 89 is provided in a positional relationship overlapping with the case 6 (see FIG. 1).

With this configuration, as shown in FIG. 5, the charging pipe CP can be inserted into the insertion port 890 without significant protrusion toward the case 6 at the rear side of vehicle.

The ease of use of the oil level gauge G is therefore not significantly adversely affected when the power transmission device 1 is mounted in the vehicle V.

In the foregoing embodiment, a case was illustrated in which the power transmission device 1 transmits the rotation of the engine ENG to the drive wheels WH, WH, but it is also possible for the power transmission device 1 to transmit the rotation of at least one of the engine ENG or the motor (rotary electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited only to those aspects shown in the embodiments. The present invention may be appropriately modified within the scope of the technical concept of the invention.

EXPLANATION OF THE REFERENCE SYMBOLS

1 Power transmission device; 2 Forward/reverse switching mechanism (power transmission mechanism); 3 Variator (power transmission mechanism); 4 Reduction mechanism (power transmission mechanism); 5 Differential device (power transmission mechanism); 6 Case; 8 Second cover (torque converter cover); V Vehicle; HS Housing; CV Control valve; 20 Input shaft; 33 Output shaft (other intermediate shaft); 42 Idler gear; 43 Reduction gear (transmission gear); 44 Idler shaft (intermediate shaft); 45 Final gear (rotating body); 50 Differential case (rotating body); 55A, 55B Drive shafts (output shafts); 66 Baffle plate (cover); 661 Side plate section (first cover section); 662 Arcuate wall section (second cover section); 89 Recess; 895 First wall section; 896 Second wall section; and 890 Insertion port.

The invention claimed is:
1. A power transmission device for a vehicle, comprising:
a housing that accommodates a power transmission mechanism; and a control valve configured to control a pressure of oil supplied to the power transmission mechanism, wherein the power transmission mechanism includes an input shaft, an intermediate shaft, and an output shaft, the housing defines an insertion hole for a charging pipe, the output shaft is located farther toward a rear of the vehicle than the input shaft, the intermediate shaft is located above the output shaft, the control valve is arranged upright on a vehicle front side of the input shaft, the housing is provided with a recessed portion that is recessed inwardly in a region of the housing below the intermediate shaft and further toward the rear of the vehicle than the output shaft, the insertion hole is provided in a bottom section of the recessed portion when viewed from above, the intermediate shaft is located farther toward the rear of the vehicle than the output shaft, and the insertion hole is provided in a location where a straight line along an opening direction of the insertion hole intersects a straight line connecting the intermediate shaft and the output shaft below the output shaft.

2. The power transmission device as claimed in claim 1, further comprising a rotating body provided coaxially with the output shaft and involved in transmission of rotation between the output shaft and the intermediate shaft, and a cover covering one side of the rotating body in an axial direction of the output shaft, wherein when viewed from a radial direction of the output shaft, the insertion hole is provided in a positional relationship overlapping with the cover.

3. The power transmission device as claimed in claim 2, wherein the rotating body includes a differential case, and a final gear fixed to an outer circumference of the differential case, the intermediate shaft has a transmission gear which meshes with the final gear, and an idler gear involved in transmission of rotation with another intermediate gear, in an axial direction of the intermediate shaft, the idler gear is located to one side of where the cover is located seen from the transmission gear, and as viewed from the rear of the vehicle, the insertion hole is provided in a positional relationship overlapping the idler gear.

4. The power transmission device as claimed in claim 3, wherein as viewed from the axial direction of the output shaft, the recessed portion is provided with a first wall section on an idler gear side, and as viewed from the rear of the vehicle, a bottom edge of the first wall section is located below a bottom edge of the idler gear.

5. The power transmission device as claimed in claim 3, wherein as viewed from the rear of the vehicle, the recessed portion is provided with a second wall section on a final gear side adjacent to the one side of the rotating body covered by the cover.

6. The power transmission device as claimed in claim 3, wherein as viewed from the rear of the vehicle, the cover has a first cover section covering a side of the final gear facing the differential case on the one side of the rotating body, and a second cover section covering a lower outer circumference of the differential case.

7. A power transmission device for a vehicle, comprising:

a housing that accommodates a power transmission mechanism; and a control valve configured to control a pressure of oil supplied to the power transmission mechanism, wherein the power transmission mechanism includes an input shaft, an intermediate shaft, and an output shaft, the housing defines an insertion hole for a charging pipe, the output shaft is located farther toward a rear of the vehicle than the input shaft, the intermediate shaft is located above the output shaft, the control valve is arranged upright on a vehicle front side of the input shaft, the housing is provided with a recessed portion that is recessed inwardly in a region of the housing below the intermediate shaft and further toward the rear of the vehicle than the output shaft, the insertion hole is provided in a bottom section of the recessed portion when viewed from above, the housing has
a case accommodating the power transmission mechanism,
and
a torque converter cover covering an opening of the case
facing a torque converter, and the recessed portion is provided to the torque converter cover.

8. The power transmission device as claimed in claim 7, wherein the intermediate shaft is located farther toward the rear of the vehicle than the output shaft, and the insertion hole is provided in a location where a straight line along an opening direction of the insertion hole intersects a straight line connecting the intermediate shaft and the output shaft below the output shaft.

9. The power transmission device as claimed in claim 7, wherein as viewed from an axial direction of the output shaft, the recessed portion is provided in a positional relationship overlapping with the case.

* * * * *